(12) United States Patent
Daniel et al.

(10) Patent No.: US 7,135,209 B2
(45) Date of Patent: Nov. 14, 2006

(54) WATER SOLUBLE RADIATION ACTIVATABLE POLYMER RESINS

(75) Inventors: Thomas Daniel, Waldsee (DE); Rainer Dyllick-Brenzinger, Speyer (DE); Ralf Fink, Schifferstadt (DE); Karl-Heinz Schumacher, Neustadt (DE); Oliver Koch, Dürkheim (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 32 days.

(21) Appl. No.: 10/478,279

(22) PCT Filed: May 29, 2002

(86) PCT No.: PCT/EP02/05901

§ 371 (c)(1),
(2), (4) Date: Nov. 19, 2003

(87) PCT Pub. No.: WO02/100912

PCT Pub. Date: Dec. 19, 2002

(65) Prior Publication Data

US 2004/0137250 A1    Jul. 15, 2004

(30) Foreign Application Priority Data

Jun. 8, 2001    (DE) ................. 101 27 838

(51) Int. Cl.
- *C08J 7/18* (2006.01)
- *C08J 7/04* (2006.01)
- *C08F 7/00* (2006.01)
- *C08F 7/16* (2006.01)

(52) U.S. Cl. ............ 427/513; 522/104; 522/904; 522/35; 522/34; 522/36; 522/88; 427/342; 427/389.9; 427/391; 427/392; 427/340; 427/487; 427/508; 427/517; 427/519

(58) Field of Classification Search .......... 522/84, 522/85, 86, 104, 107, 904, 34, 35, 36; 427/342, 427/389.9, 391, 392, 487, 508, 513, 517, 427/519
See application file for complete search history.

(56) References Cited

U.S. PATENT DOCUMENTS

| | | | |
|---|---|---|---|
| 3,214,492 A | 10/1965 | Tocker | |
| 3,429,852 A | 2/1969 | Skoultchi | |
| 3,622,848 A | 11/1971 | Hendrix et al. | |
| 3,962,054 A * | 6/1976 | Wattiez et al. | 522/66 |
| 4,148,987 A | 4/1979 | Winey | |
| 4,304,895 A | 12/1981 | Loshaek | |
| 4,549,880 A * | 10/1985 | Hendrix et al. | 8/115.52 |
| 4,748,044 A | 5/1988 | Fottinger et al. | |
| 4,865,886 A * | 9/1989 | Itoh et al. | 427/342 |
| 4,922,004 A | 5/1990 | Kohler et al. | |
| 5,026,806 A | 6/1991 | Rehmer et al. | |
| 5,124,188 A * | 6/1992 | Roe et al. | 428/72 |
| 5,128,386 A | 7/1992 | Rehmer et al. | |
| 5,202,483 A | 4/1993 | Rehmer et al. | |
| 5,223,645 A | 6/1993 | Barwich et al. | |
| 5,248,805 A | 9/1993 | Boettcher et al. | |
| 5,264,533 A | 11/1993 | Rehmer et al. | |
| 5,506,279 A * | 4/1996 | Babu et al. | 522/34 |
| 5,549,791 A | 8/1996 | Herron et al. | |
| 5,755,828 A | 5/1998 | Westland | |
| 5,772,851 A | 6/1998 | Barwich et al. | |
| 6,090,236 A | 7/2000 | Nohr et al. | |
| 6,184,271 B1 | 2/2001 | Westland et al. | |
| 6,264,791 B1 * | 7/2001 | Sun et al. | 162/168.1 |

FOREIGN PATENT DOCUMENTS

| | | |
|---|---|---|
| DE | 28 18 763 | 11/1978 |
| DE | 35 34 645 | 2/1987 |
| DE | 38 36 370 | 5/1990 |
| DE | 40 37 079 | 5/1992 |
| EP | 0 279 475 | 8/1988 |
| EP | 0 346 734 | 12/1989 |
| EP | 0 377 191 | 7/1990 |
| EP | 0 377 199 | 7/1990 |
| EP | 0 427 316 | 5/1991 |
| EP | 0 427 317 | 5/1991 |
| EP | 0 429 112 | 5/1991 |
| EP | 0 445 641 | 9/1991 |
| EP | 0 655 465 | 5/1995 |
| EP | 1 013 680 | 6/2000 |
| JP | 2298-501 A | 12/1987 |
| JP | 08006252 A | 6/1994 |
| WO | WO 98/27262 | 6/1998 |

OTHER PUBLICATIONS

C. Carlini et al., *New Polymeric Mat.*, Vol. 1, No. 1, 63-83 (1987).

* cited by examiner

*Primary Examiner*—Sanza L McClendon
(74) *Attorney, Agent, or Firm*—Marshall, Gerstein & Borun LLP

(57) ABSTRACT

The present invention relates to water soluble radiation activatable polymer resin formulations which are suitable to modify the absorption properties of fibrous materials and the polymer obtained by such radiation activatable polymer resins and the method of preparing such polymer. Fibrous materials made with radiation activatable resin formulations according to this invention are especially suitable for use in disposable absorbent articles.

23 Claims, No Drawings

WATER SOLUBLE RADIATION ACTIVATABLE POLYMER RESINS

CROSS-REFERENCE TO RELATED APPLICATION

This is the U.S. national phase application of International Application No. PCT/EP02/05901, filed May 29, 2002.

The present invention relates to water soluble radiation activatable polymer resin formulations which are suitable to modify the absorption properties of fibrous materials and the polymer obtained by such radiation activatable polymer resins and the method of preparing such polymer. Fibrous materials made with radiation activatable resin formulations according to this invention are especially suitable for use in disposable absorbent articles.

Radiation activatable resin compositions obtained by copolymerization of polymerizable photoinitiators with suitable co-monomers are known and have been disclosed in EP 377 199, EP 445 641, and U.S. Pat. No. 5,026,806.

Radiation activatable photoinitiators as such are known in the art and such photoinitiator groups and their synthesis have been disclosed in EP 377 191, U.S. Pat. No. 3,214,492, U.S. Pat. No. 3,429,852, U.S. Pat. No. 3,622,848, U.S. Pat. No. 4,304,895, DE-3534645, DE-2818763, EP-279 475, and New Polym. Mat. 1, 63 (1987).

Radiation activatable resins as known in the art are described in particular for being used in hotmelt (contact) adhesives and sealing compounds. Other applications of photoactivatable resins are described in U.S. Pat. No. 4,748,044 for the production of non-woven webs.

The photoactivatable resins which are used for adhesive and sealing applications typically exhibit a very low glass transition temperature $T_g$, preferably a $T_g < 0°$ C., in order to be elastic materials or highly viscous liquids and are sufficiently tacky under ambient use conditions.

It is also well known in the art that cross-linked cellulose is superior to un-cross-linked cellulose when used in absorbent articles. Cross-linked cellulose for such applications is well-known and disclosed as such in EP 427316, U.S. Pat. No. 5,549,791, WO 98/27262, U.S. Pat. No. 6,184,271, EP 429112, and EP 427317.

Such cellulosic fibers as described in the art exhibit good fluid absorption properties and have found widespread commercial applications in disposable absorbent articles like diapers.

However, the processes to cross-link cellulose fibers as described above commonly take advantage of a chemical condensation reaction—for example an esterification reaction—between a poly-functional carboxylic acid and the cellulose fiber. It typically requires elevated temperatures and long reaction (curing) time periods to accomplish this reaction satisfactorily.

The processes comprise many different steps and long process cycles and therefore are relatively expensive.

In addition the cellulose fibers become yellowish and brownish which is unacceptable in many hygiene applications and hence requires covering the cellulose material with an in-transparent layer or use of an additional whitening agent in such cases.

The desired fiber stiffness and resiliency which allows to maintain an open structure in an absorbent article, and which is accomplished by the fiber cross-linking reaction as described above, is often accompanied with an increased brittleness of the fibers and discoloration.

Brittleness leads to undesired break up of the fibers in transport to the fiber user and processing at the fiber users plants.

Discoloration makes the disposable absorbent article to be perceived as low quality and dirty by the end user.

It is therefore desirable to employ reagents for cross-linking which allow for a fast cross-linking reaction under mild conditions.

Photoactivatable, cellulose based compositions are known, which are derived from cellulose based materials, as described in JP-2298501, or JP-08006252 which relates to a general purpose photosensitive resin composition, and in U.S. Pat. No. 6,090,236 a process is claimed to create coatings for a web structure by radiation induced polymerization of monomeric or oligomeric materials.

So far, it is however not known from the state of the art that photo-activatable polymeric reagents have been used for cross-linking of cellulosic fibrous materials.

Hence, one object of the present invention is to provide a photo-activatable polymeric reagent which allows to cross-link cellulose fibers with much reduced chemical damage (discoloration).

Another object of the present invention is to provide a photo-activatable polymeric reagent which provides the desired stiffness but significantly reduces the cross-linking reaction time period in order to avoid mechanical damage to the fiber.

Another object of the present invention is to provide a photo-activatable polymeric reagent which allows for simplification of the cellulose cross-linking processes as described above.

Yet another object of the present invention is to provide a photo-activatable polymeric reagent which allows to obtain cross-linked cellulose fibers which exhibit fluid uptake and drainage properties equal or superior to the reagents used in the state of the art processes.

It has now been surprisingly found that polymeric resins comprising photo-reactive groups as e.g. described in EP 377 191 and produced by copolymerization with suitable comonomers that render the $T_g$ of the resulting photo-activatable resin equal or above 5° C. are quite suitable to accomplish the objectives of the present invention. Another characteristic of the photo-activatable resins according to the present invention is their partial solubility in water which is important ion preferred embodiments of the present invention.

Polymeric resins suitable as adhesives or sealants have been disclosed in EP 377 199, EP 445 641, and U.S. Pat. No. 5,026,806. Processes to synthesize such resins are described in U.S. Pat. No. 5,026,806 and EP 655 465.

These resins are obtained by copolymerizing suitable co-monomers with polymerizable and radiation activatable photoinitiators which have been disclosed in EP 377 191, U.S. Pat. No. 3,214,492, U.S. Pat. No. 3,429,852, U.S. Pat. No. 3,622,848, U.S. Pat. No. 4,304,895, DE 3534645, DE 2818763, EP 35 279 475, EP 346 734, DE 4037079 and New Polym. Mat. 1, 63 (1987) all of which are expressly incorporated herein by reference.

Suitable comonomers are described for example in DE 38 36 370. These and other suitable comonomers are not radiation activatable but can form the backbone of the resin to which said photo-reactive groups can be attached by copolymerization or other covalent, ionic or apolar binding reactions.

In the present invention it was found that a composition comprising a polymeric backbone and radiation-activatable groups, capable of forming covalent cross-linking bonds upon being impacted by radiation energy and being permanently fixed on a fibrous material after irradiation, hereinafter referred to as "radiation activatable polymeric resins", can function very well as radiation activatable cross-linkers for fibrous materials. Fibrous material can contain only one kind of fibers or mixtures thereof, preferable one kind of fibers. Preferable fibrous materials comprise fibers of cellulose, polyethylene, polypropylene, poly-ester, polyacrylonitrile, polyamide and protein, preferable fibers of cellulose. The invention is described for celluose, the inventive concept can also be applied to other fibers.

The polymeric backbone in the radiation activatable polymeric resins is for example obtainable from one kind or a combination of two or more monomer molecules selected from the group of ethylene, propylene, vinyl chloride, vinyl amine, allyl amine, vinyl formamide, vinyl acetamide, aziridine, vinyl alcohol, vinyl acetate, isobutylene, styrene, isoprene, acrylonitrile, acrylic acid, methacrylic acid, ethyl acrylate, butyl acrylate, maleic acid, maleic acid anhydride, maleic acid esters, fumaric acid, itaconic acid, methyl-methacrylate, vinyl acrylate, allylmethacrylate, allylsulfonate, vinyl sulfonate, acrylamide, methacrylamide, acrylamidomethylpropansulfonate (AMPS), $C_1$–$C_4$-hydroxyalkyl methacrylates, $C_1$–$C_4$-hydroxyalkyl acrylates, tripropylene glycol diacrylate, trimethylol propane ethoxylated triacrylate, epoxy acrylates, polyethylenglycolmonoacylate, polyethylenglycoldiacrylate, ethylenoxide, poylethyleneglycole-monoallylether, polyethylenglycole-diallylether, ethoxylated trimethylolpropane-triacrylate, propylenoxide, polyester acrylates, and urethane acrylates. Preferred are polymeric backbones obtainable from essentially only one kind of monomers.

Preferred monomer-units according to the present invention are: acrylic acid, methacrylic acid, maleic acid, fumaric acid, itaconic acid, vinylsulfonic acid, allylsulfonic acid, acrylamidomethanpropane, sulfonic acid, vinylalcohol, vinylamine, allylamine, Polyethylenglycolemonoacrylate, Polyethyleneglycoldiarcrylate, Poylethyleneglycole-monoallylether, Polyethylenglycole-diallylether, ethoxylated trimethylolpropane-triacrylate. Examples of other hydrophilic monomers are monomers containing hydroxyl groups, in particular $C_1$–$C_4$-hydroxyalkyl (meth)acrylates, and (meth)acrylamide.

More preferred is a polymeric backbone in the radiation activatable polymeric resins which is obtainable from one kind or a combination of two or more monomer molecules selected from the group acrylic acid, maleic acid, maleic acid anhydride, allyl amine, vinyl formamide, vinyl acetamide, aziridine, vinyl acetate, allyl sulfonate, vinyl sulfonate, acrylamidomethylpropansulfonate (AMPS).

Such radiation activatable polymeric resins can be produced according to the known processes for adhesives and sealants as described in the art.

In the present invention it was found that preferably copolymers of these known photo-reactive groups with predominantly hydrophilic comonomers in the polymeric backbone can function very well as radiation activatable cross-linkers for fibrous cellulose materials.

However, radiation activatable polymeric resins according to the present invention exhibit a glass transition temperature $T_g$ equal or more than 5° C., i.e. more than 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28∞ C., 29° C., 30° C., preferably at least $T_g$>30° C., i.e. more than 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., more preferably at least $T_g$>50° C., i.e. 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., and most preferably at least $T_g$>80° C., i.e. more than 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., and higher temperatures.

The glass transition temperature of the polymer is determined by differential scanning calorimetry as described in ASTM 3418/82-"Midpoint Temperature".

This is an important aspect of the present invention as the cellulosic fibers treated with the resins according to the present invention should exhibit a feel and appearance equal or better than conventionally treated fibers. In particular it is not desired that the fiber surfaces become tacky.

In another aspect of the present invention it is preferable to use radiation activatable polymeric resins which are at least partially soluble in water. This aspect is important as the application of the resin can preferably be done as an aqueous solution which can be sprayed onto the fibers, or into which the fibers can be immersed. Another preferred embodiment of the present invention is to prepare an aqueous slurry of the radiation activatable resin in order to obtain a lower viscous material which can be easily applied by spraying onto the fibers.

Such a slurry may be obtained by dissolving or dispersing said radiation activatable polymeric resin in water under ambient conditions, if necessary to obtain a sufficiently low viscosity solution or dispersion the temperature of the slurry can be adjusted between 0° C. and 100° C.

Hence, it is preferable that the radiation activatable polymeric resins according to the present invention exhibit a substantial solubility in water. Radiation activatable resins according to the present invention exhibit a solubility of at least 1 g/kg, i.e. at least 2 g/kg, 3 g/kg, 4 g/kg, 5 g/kg, 6 g/kg, 7 g/kg, 8 g/kg, 9 g/kg, more preferable at least 10 g/kg, i.e. at least 11 g/kg, 12 g/kg, 13 g/kg, 14 g/kg, 15 g/kg, 16 g/kg, 17 g/kg, 18 g/kg, 19 g/kg, 20 g/kg and most preferable >20 g/kg, i.e. at least 21 g/kg, 22 g/kg, 23 g/kg, 24 g/kg, 25 g/kg, 26 g/kg, 27 g/kg, 28 g/kg, 29 g/kg 30 g/kg, 35 g/kg, 40 g/kg, 45 g/kg, 50 g/kg, and more g/kg in water at room temperature (20 ° C.).

The preferred radiation activatable polymeric resin is in addition capable to form cross-linking bonds to the fibrous material by a thermal curing treatment preceding the irradiation step, during the irradiation step, or after the irradiation step.

Above mentioned photo-reactive groups are capable to form covalent bonds by exposure to electromagnetic radiation. Suitable electromagnetic radiation can be produced by electron beams as well as UV-Light. Preferably, according to the present invention UV-Light is used with a wave-length of 220–340 nm, most preferable with a wave-length of between 220 nm–280 nm. The UV-Light may be used in combination with an electron-beam, and also in combination with IR-Light. In case of combination of UV-Irradiation with other electromagnetic radiation, it is considered not to be critical if the application of the UV-Light takes place simultaneously with the other electromagnetic radiation (i.e.

electron-beam or IR-Light), or if irradiation is done in a series of different irradiation steps.

In an additional embodiment of the invention the radiation activatable polymeric resin is additionally capable to form cross-linking bonds to the fibrous material as described before wherein crosslinking takes place prior to, simultaneously or after intrafiber crosslinking the fibrous material by a thermally reactive agent. This optionally used thermally reactive agent is a low molecular crosslinker as e.g. described in EP 429 112, EP 427 317 and EP 252 649 or any Fixapret (BASF products). Fixaprets are modified Dimethyloldihydroxyethylene urea as described in DE-A 19654739 wherein the given definitions of $R^1$ and $R^2$ are preferred. Within this invention $R^1$ and $R^2$ may be independently of each other any $C_1$ to $C_{14}$ Alcohol or polyol as described in DE-A 19654739.

Polymer as used in the description refers if not otherwise indicated to polymers obtainable from a radiation activatable polymeric resin comprising a polymeric backbone and radiation-activatable groups, capable of forming covalent cross-linking bonds upon being impacted by radiation energy and being permanently fixed on a fibrous material after irradiation. Preferably such polymers are obtainable by the above mentioned irradiation conditions.

The polymer of the invention can be characterized as having a MDP value equal or smaller than 18, i.e smaller than 17.8, 17.6, 17.4, 17.2, 17.0, 16.8, 16.6, 16.4, 16.2, preferably smaller than 16, i.e smaller than 15.8, 15.6, 15.4, 15.2, 15.0, 14.8, 14.6, 14.4, 14.2, 14.0, more preferably smaller than 14, i.e smaller than 13.8, 13.6, 13.4, 13.2, 13.0, 12.8, 12.6, 12.4, 12.2, 12.0, 11.8, 11.6, 11.4, 11.2, 11.0 and even less.

The polymer of the invention can also be characterized as having a brightness equal or larger than 76, i.e. larger than 76.2, 76.4, 76.6, 76.8, 77.0, 77.2, 77.4, 77.6, 77.8, preferably larger than 78, i.e. larger than 78.2, 78.4, 78.6, 78.8, 79.0, 79.2, 79.4, 79.6, 79.8, more preferably larger than 80, i.e. larger than 80.2, 80.4, 80.6, 80.8, 81.0, 81.2, 81.4, 81.6, 81.8, 82, and even larger.

Brightness is measured as given in Procedure C.

Alternatively, the polymer of the invention can also be characterized as having a CIE-brightness equal or larger than 45, i.e. larger than 46, 47, 48, 49, 50, 51, 52, 53, 54, preferably larger than 55, i.e. larger than 56, 57, 58, 59, 60, 61, 62, 63, 64, more preferably larger than 65, i.e. larger than 66, 67, 68, 69, 70, 71, 72, 73, 74, 75, and even larger.

Preferably the polymer of the invention shows a combination of the good parameters MDP and brightness.

More preferably the polymer is obtainable from a radiation activatable polymeric resin as described in the invention.

A preferred method of preparing said polymer is wherein the radiation energy for impacting on said radiation activatable polymeric resin is elected from the group of UV, electronic beam and IR-Light, preferably UV light of between 220 nm and 340 nm, more preferred is UV light with a wavelength of between 220 nm and 280 nm.

More preferred is a method, wherein the radiation activatable polymeric resin is applied in amounts of less than 50% by weight of fibrous material, preferably in amounts of less than 25% and most preferably in amounts of less than 15%.

Most preferred is a method, wherein the radiation activatable polymeric resin is applied in amounts resulting in a polymer/fibrous material dry weight portion of more than 0.10% by weight of fibrous material, preferably in amounts of more than 1.0% and most preferably in amounts of 2–15%.

Examples of processes in which the novel radiation activatable resins can be advantageously applied are given below. However, these examples are by no means limiting to the use of radiation activatable polymeric resins according to the present invention.

For example, an aqueous solution may be sprayed onto the fibers by means of a fluidized-bed spraying chamber. Simultaneously IR-Radiation may be applied to accomplish drying and simultaneously UV-Light may be applied to accomplish cross-linking in the fluidized bed.

Another example of an embodiment of the present invention is to immerse the fibers in an aqueous radiation activatable resin solution, thereafter forming a sheet- or web-like structure from the wetted fibers by means of a wet-lay process, and this structure may than be simultaneously dried by IR-Light and simultaneously cross-linked by UV-Light.

However, in certain cases the drying and the curing may take place in two steps in series, which could be carried out in any order. Instead or in combination with IR-Light, any conventional drying equipment can be used in the drying step. However, in certain embodiments of the present invention little or no drying is required.

The cross-linking of the cellulosic fibrous material with the radiation activatable polymeric resins according to the present invention effectively takes place by the photoreactive groups of said resin forming covalent bonds. On exposure to electromagnetic radiation, most preferably to UV-Irradiation, a covalent bond is formed by means of a chemical grafting reaction.

In particular, the cross-linking may take place by insertion of a light-activated carbonyl group of the photo-reactive group in the resin into an adjacent C—H bond, forming a —C—C—O—H group. Said C—H bond may be part of a nearby polymer chain. Said polymer chain may be another radiation activatable resin molecule or may be part of another polymer which is in close contact with the radiation activatable resin. It thus may be part of the cellulosic fibrous material.

The photo-reactive group of said radiation activatable polymeric resin and the preparation of said radiation activatable polymeric resins is more closely described below.

The radiation activatable polymeric resin according to the present invention preferably comprises from 0.0001 to 0.3 mol, preferred from 0.0003 to 0.1 mol, particularly preferably from 0.0005 to 0.05 mol, very particularly preferably from 0.001 to 0.04 mol, or from 0.002 to 0.03 mol, or from 0.002 to 0.02 mol of the photoinitiator per 100 g of polymer.

The photo-reactive group preferably comprises an acetophenone-, benzophenone-, anthraquinone-, benzile-, thioxanthone-, and xanthone-derivative or particularly preferably a benzophenone derivative.

The radiation activatable polymeric resin most preferably comprises an anchor group which is covalently bound to the polymeric backbone. Preferably the anchor group is a photoreactive group which has been incorporated into the polymer chain by free-radical copolymerization. For this purpose the photo-reactive group preferably comprises an acrylic or methacrylic group.

Suitable copolymerizable photo-reactive groups are derivatives of acetophenone or benzophenone which contain at least one, preferably one, ethylenically unsaturated group. The ethylenically unsaturated group preferably comprises an acrylic or methacrylic group.

The ethylenically unsaturated group may have direct bonding to the phenyl ring of the derivative of acetophenone or of benzophenone. There is generally a spacer group (spacer) between the phenyl ring and the ethylenically unsaturated group.

The spacer group is preferably selected from a covalent bond, an organic bifunctional radical with a molecular weight of up to Mw=1000, or a polymeric bifunctional radical chain with a molecular weight of up to Mw=20000.

Alternatively, the spacer group may, for example, contain up to 100 carbon atoms.

The radiation-activatable group may be represented by formula II formula II:

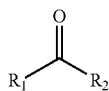

in which $R_1$ denotes an organic radical selected from the group of methyl, aryl, preferably phenyl or substituted phenyl group and $R_2$ selected from the group of either aryl or alkyl of 1 to 4 carbon atoms, cyclopropyl, cyclopentyl, cyclohexyl, $\alpha,\alpha$-dialkoxyalkyl or $\alpha$-hydroxyalkyl group, and is covalentely bound to the spacer group.

Suitable acetophenone derivatives or benzophenone derivatives are described, for example, in EP-A-346 734, EP-A-377199, EP-A-246848, DE-A-4 037 079 and DE-A-3 844 444 and are also disclosed in the present application herewith by reference.

Preferred acetophenone derivatives and benzophenone derivatives have the formula I

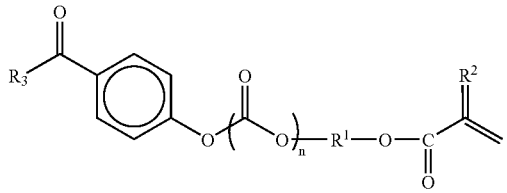

wherein
n is 0 or 1,
$R^1$ is an organic radical having up to 100 carbon atoms which may be interrupted by up to 49 oxygen atoms,
$R^2$ is a hydrogen atom or methyl and
$R^3$ is unsubstituted or substituted phenyl or $C_1$–$C_4$-alkyl.
$R^1$ is preferably an organic radical having between 4 and 60 carbon atoms which may be interrupted by between 1 and 29 oxygen atoms, in particular having between 10 and 40 carbon atoms which may be interrupted by between 4 and 19 oxygen atoms.
$R^1$ is particularly preferably alkylene, in particular $C_2$–$C_8$-alkylene.
$R^3$ is particularly preferably methyl or phenyl.

The polymer has preferably been built up from free-radical polymerizable compounds (comonomers).

At least 40% by weight of the polymer, particularly preferably at least 60% by weight, very particularly preferably at least 80% by weight, is composed of afore said suitable comonomers.

Said suitable comonomers which are non photo-reactive form the backbone of said radiation activatable polymeric resin. Such comonomers are selected from the groups of hydrophilic comonomers but can at least partially also include hydrophobic comonomers.

However, according to the present invention, the hydrophilicity of the radiation activatable polymeric resin plays a vital role for its suitability as cellulose cross-linker. Therefore in a most preferred embodiment of the present invention, only hydrophilic comonomers are being used as comonomers to form the back-bone of said radiation activatable polymeric resin.

A hydrophilic comonomer according to the present invention is a monomer-unit which is substantially soluble in water, preferably exhibits a solubility of >50 g/kg in water under ambient conditions, most preferable is soluble in water in any mixing ratio.

Said hydrophilic comonomers may contain the following groups as art of a monomer molecule: carboxylic acid, sulfonic acid or phosphonic acid. Carboxylic and sulfonic acid groups are preferred.

Said hydrophilic comonomers may also be incorporated into the polymer backbone by copolymerization with a pre-cursor molecule. Examples of preferred precursors are Vinylformamide and Vinylacetate, Vinylactamide, all of which will have to be finally hydrolized after the polymerization in order to incorporate the corresponding monomer units vinylamine and vinylalcohol into the backbone.

Typical—but not limiting—examples for such preferable monomer-units according to the present invention are: acrylic acid, methacrylic acid, maleic acid, fumaric acid, itaconic acid, vinylsulfonic acid, allylsulfonic acid, acrylamidomethanpropane sulfonic acid, vinylalcohol, vinylamine, allylamine, Polyethylenglycolemonoacrylate, Polyethyleneglycoldiacrylate, Poylethyleneglycolemonoallylether, Polyethylenglycolediallylether, ethoxylated trimethylolpropane-triacrylate.

Examples of other hydrophilic monomers are monomers containing hydroxyl groups, in particular $C_1$–$C_4$-hydroxyalkyl (meth) acrylates, and (meth)acrylamide.

Preferred is an average molecular weight of the radiation activatable polymeric resin between 5000 and 200000, more preferably between 10000 and 150000, particular preferably between 30000 and 150000 Daltons.

In cases where comonomers are employed that exhibit more than one ethylenically unsaturated group, the radiation activatable polymeric resin obtained is already slightly cross-linked during its synthesis and depending on the degree of cross-linking is no longer soluble but only dispersible in water or aqueous solutions.

Said hydrophilic comonomers are e.g. preferably copolymerized for themselves, or in any mixture therefrom, with said copolymerizable photo-reactive groups.

Alternatively, in order to tailor make the properties of the radiation activatable resin said hydrophilic comonomers can be used in combination with said hydrophobic comonomers and said copolymerizable photo-reactive groups.

Said hydrophobic comonomers are selected from the group consisting of $C_1$–$C_{20}$-alkyl (meth)acrylates, vinyl esters of carboxylic acids containing up to 20 carbon atoms, vinyl aromatics having up to 20 carbon atoms, ethylenically unsaturated nitriles, vinyl halides, vinyl ethers of alcohols containing from 1 to 10 carbon atoms, aliphatic hydrocarbons having from 2 to 8 carbon atoms and 1 or 2 double bonds, and mixtures of these monomers.

Specifically suitable as hydrophobic comonomers are alkyl (meth)acrylates having a $C_1$–$C_{10}$-alkyl radical, such as methyl methacrylate, methyl acrylate, n-butyl acrylate, ethyl acrylate and 2-ethylhexyl acrylate.

Examples of vinyl esters of carboxylic acids having from 1 to 20 carbon atoms are vinyl laurate, vinyl stearate, vinyl propionate, vinyl versatates and vinyl acetate.

Possible vinyl aromatic compounds are vinyl toluene, α- and p-me-thylstyrene, α-butylstyrene, 4-n-butylstyrene, 4-n-decylstyrene and, preferably, styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Examples of vinyl ethers which should be mentioned are vinyl methyl ether and vinyl isobutyl ether. Preference is given to vinyl ethers of alcohols containing from 1 to 4 carbon atoms.

As hydrocarbons having from 2 to 8 carbon atoms and two olefinic double bonds, mention should be made of butadiene, isoprene and chloroprene.

Preferred hydrophobic comonomers are the $C_1$–$C_{10}$-alkyl acrylates and $C_1$–$C_{10}$-alkyl methacrylates, in particular $C_1$–$C_8$-alkyl acrylates and $C_1$–$C_8$-alkyl methacrylates, and in each case the acrylates are particularly preferred.

Very particular preference is given to methyl acrylate, ethyl acrylate, n-butyl acrylate, n-hexyl acrylate, octyl acrylate and 2-ethylhexyl acrylate, and also to mixtures of these monomers.

Any mixture of said hydrophilic and hydrophobic comonomers may be used for preparation of radiation activatable polymeric resins according to the present invention.

However, a suitable composition according to the present invention is characterized by the radiation activatable polymeric resin made thereof exhibiting a glass transition temperature of $T_g$ equal or more than 5° C., preferably at least $T_g>30°$ C., more preferably at least $T_g>50°$ C., and most preferably at least $T_g>80°$ C.

In a most preferred embodiment of the present invention the radiation activatable resins according to the present invention exhibits a substantial solubility under ambient conditions in water of not less than 1 g/kg, more preferably not less than 10 g/kg, and most preferably >20 g/kg in water.

These two conditions which are considered to be important aspects of the present invention are limiting the suitable monomer compositions according to the present invention.

Radiation activatable polymeric resins according to the present invention can be prepared preferably by a chain-polymerization reaction. Details of suitable methods are disclosed in DE 10008295.5, DE 19946898.2, and DE 19935624.6 which are explicitly incorporated herein by reference.

The preparation of the radiation activatable polymeric resins according to this invention is accomplished by chain polymerization reaction of a monomer-mixture selected from the monomers described above. The monomer mixture comprises at least one hydrophilic comonomer, and at least one copolymerizable photo-reactive group.

Optionally the mixture comprises one or more of the hydrophobic comonomers described above.

Optionally any of the known chain transfer agents described in the literature can be added to the reaction mix.

The chain polymerization reaction can be carried out as bulk-polymerization, as solution-polymerization, as emulsion-polymerization, as suspension polymerization, or preferably as precipitation-polymerization.

If a solvent is used, then water or a liquid hydrocarbon exhibiting a boiling point between 50° and 150° C., most preferably between 60° and 120° C. is used.

The polymerization reaction is carried out under the typical conditions and temperatures as described in the textbook literature which is referenced herewith in its entirety.

Any of the known initiators may be used in an amount of about 0.01 wt. %–10 wt. %, most preferably 0.1 wt. %–4 wt. % based on the weight of the total monomer composition. Typical initiators suitable for any or all of the above polymerization methods are azo-initiators, inorganic persulfates, hydrogenperoxide, organic peroxides, and all known redox-initiator systems.

After polymerization in solution or as precipitation-polymerization or as suspension-polymerization the reaction product, namely the radiation activatable polymeric resin, may be obtained as highly viscous liquid or as a solid powder by removing the solvent either by filtration, or by removing the solvent through evaporation at elevated temperature or optionally under reduced pressure.

Alternately the product may be obtained as aqueous solution.

Optionally after the formation of the radiation activatable polymeric resin the polymeric backbone may be further modified in a subsequent process step by a hydrolysis reaction, for example when vinylformamid is converted to vinylamin, or for example when vinylacetate is converted to vinylalcohol.

Optionally after the formation of the radiation activatable polymeric resin the polymeric backbone may be further modified in a subsequent process step by a reaction with ethylene oxide or a reaction with aziridine in order to optimize the water solubility of the resin further.

EXAMPLES AND PROCEDURES

A. Procedure for Determining "Maximum Fluid Absorption Capacity" (Uptake)

The Maximum Fluid Absorption Capacity—in the following called Uptake—is determined with a TRI-Autoporosimeter from TRI/Princeton, P.O. Box 625, Princeton, N.J. 08542 USA. The program "STG LIQUID AUTOPOROSIMETER STANDARD PROGRAM VERSION 2000.4" is used to run the measurement according to the literature (B. Miller, I. Tyomkin, Liquid Porosimetry, Journal of Colloid and interface science 1994, 162, 163–170). The Uptake is the maximum of the first hysteresis loop. The sample in the test chamber is measured under load of 0.2 psi realized by an adequate weight on the sample.

B. Procedure for Determining "Medium desorption Pressure" (MDP)

The Medium Desorption Pressure is determined as the pressure on the x-axis at an Uptake of 50% on the desorption branch of the above described hysteresis loop.

C. Procedure for Determining Brightness of the UV-Activated Fibrous Material

Brightness is measured with an electric remission photometer (ELREPHO-machine from Carl Zeiss Carl Zeiss UB Industrielle Meβ-technik D-73446 Oberkochen following the "Weiβegrad-Mes-sung"—description in the handbook).

Alternatevely the CIE Brightness may be determined using Elrepho 2000 from Datacolor GmbH, Mainstr. 4a, D-45768 Marl, Germany. The CIE Brightness refers to the recommendation of Commission International d'Elcairage (CIE).

D. Procedure for Determining Water Solubility

A solution is made by adding a certain amount of polymer to a defined amount of water with additional stirring for 2 h at room temperature until no more residue could be detected by filtration through a paper filter of a pore size from about 32 μm to about 57 μm.

E. Procedure for Determining Glass Transition Temperature

The glass transition temperature was determined by means of Differential Scanning Calorimetrie (ASTM, 3418/82 "Midpoint Temperature").

F. Procedure for Determining Molecular Mass Distribution

The molecular mass distributions and average molecular weights are determined by Size Exclusion Chromatography. Columns from Toso Haas company of Typ TSK HXL are used. UV detection is performed by an UV-detector at a wavelength of 208 nm. Pullulan standards were used for calibration.

The following examples illustrate the practice of the present invention but are not intended to be limiting thereof.

Example I

To demonstrate the improvement achieved by the present invention, cellulosic fibers taken out of a diaper are tested. Therefore crosslinked cellulosic fibers taken out of Pampers Acquisition-Layer are air laid to form absorbent pads with a thickness of about 8 nm, equal to a web of 250 g/m². The results are described in table 1.

Example II

Polyacrylic acid can be permanently fixed on a fibrous material by thermal crosslinking. The process to use to produce said modified fibrous material is as follows:
1. Provide for each sample 30 g of cellulosic fiber.
2. Form a slurry by adding the fibers to 1028 ml of water containing 15 g of a dissolved polyacrylic acid with a molecular weight of 100000 (Mw). Soak the fibers in the slurry for about 60 minutes. The pH value is about 2.
3. Then dewater the fibers on a porous plate using a water pump to a consistency ranging from about 25% to about 30% and let follow an air-drying with pressure to a consistency of about 50% to about 55%.
4. Then defibrate the fibers using a "abc standmixer Mod. 260 FD-716" from abc Elektrovolz GmbH and Co, P.O. Box 1141, 73219 Kirchheim/Teck by adding portions of about 2 g and stirring each portion for between 5 to 10 sec.
5. Then place the defibrated fibers on porous plates and further dry by air-pressure to a consistency of about 90% to about 95%.
6. Then cure the nearly dry fibers in an air-through drying oven for a period of about 2 to about 20 minutes in this example 10 min and at a temperature of about 180° C. to about 220° C. in this example 200° C.
7. Then place the fibers on a mesh screen rinsed with 3 l of about 60° C. water followed by steps 3–5.
8. Air lay the fibers to form absorbent pads with a thickness of about 8 mm, equal to a web of 250 g/m². The results are described in table 1.

Example III

Polymeric resins comprising UV-reactive groups of the present invention can be permanently fixed on a fibrous material by suitable activation of the UV-reactive groups and subsequent chemical reaction. The process to use for producing said modified fibrous material is as follows:
1. Provide for each sample 30 g of cellulosic fiber.
2. Form a slurry by adding the fibers to 1028 ml of water containing 15 g of a dissolved polymer containing 90% by weight acrylic acid and 10% by weight fotoinitiator Uvecryl P 36 and with a molecular weight of 100000 (Mw). The formula of Uvecryl P 36 is represented by:

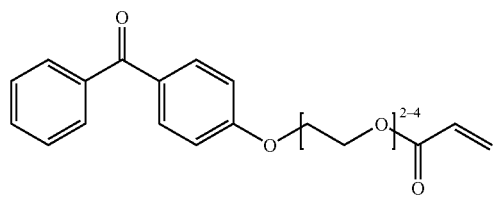

Soak the fibers in the slurry for about 60 minutes. The pH value is about 2.
3. Then dewater the fibers on a porous plate using a water pump to a consistency ranging from about 25% to about 30%, followed by air-drying with pressure to a consistency of about 50% to about 55%.
4. Then defibrate the fibers using a "abc standmixer Mod. 260 FD-716" from abc Elektrovolz GmbH and Co, P.O. Box 1141, 73219 Kirchheim/Teck by adding portions of about 2 g and stirring each portion for between 5 to 10 sec.
5. Then place the defibrated fibers on porous plates and further dry by air-pressure to a consistency of about 90% to about 95%.
6. Air lay the fibers to form absorbent pads with a thickness of about 1.5 mm, equal to a web of 40 g/m².
7. Irradiate the air-laid pads on a line with a mercury medium pressure UV-lamp with 160 W/cm. Supply an UV dose of approximately 570 mJ/cm² for UV-C and 4120 mJ/cm² for UV-A; the intensity 68 mW/cm² for UV-C and 441 mW/cm² for UV-A (determined by a PP2000 Power Puck from Eltosch GmbH).
8. Again air lay the fibers to form absorbent pads with a thickness of about 8 mm, equal to a web of 250 g/M².

Example IV

Polymeric resins comprising UV-reactive groups of the present invention can be used in a process in accordance with the herein—before described procedure of Example III with the following modifications:

Air lay the fibers in step 6 to form absorbent pads with a thickness of about 8 mm, equal to a web of 250 g/m² and subsequently irradiate with this thickness with the same UV-dose as described above in step 7.

Example V

Polymeric resins comprising UV-reactive groups of the present invention can be used in a process in accordance with the herein—before described procedure of Example III with the following modifications:

Air lay the fibers in step 6 to form absorbent pads with a thickness of about 3 mm, equal to a web of 80 g/m². Irradiate the air-laid pads according to step 7 with the modification of using UV-A-light only. The UV-A dose supplied is approximately 12200 mJ/cm² and the intensity 45 mW/cm² (determined by a PP2000 Power Puck from Eltosch GmbH).

Example VI

Polymeric resins comprising UV-reactive groups of the present invention can be used in a process in accordance with the herein—before described procedure of Example III with the following modifications:

Additionally cure the air laid pads in step 9 in an air-through oven over the period of 5 minutes at a temperature of 200° C.

Example VII

Polymeric resins comprising UV-reactive groups of the present invention can be used in a process in accordance with the herein—before described procedure of Example III with the following modifications:

Use for the polymer in step 2 having 70% by weight acrylic acid, 20% by weight maleic acid and 10% by weight the fotoinitiator acryloxybenzophenone and with a molecular weight of 100000 (Mw). Form a slurry by adding the fibers to 1028 ml of water containing 25 g of said dissolved polymer. Soak the fibers in the slurry for about 60 minutes. The pH value is about 2.

Example VIII

Polymeric resins comprising UV-reactive groups of the present invention can be used in a process in accordance with the herein—before described procedure of Example III with the following modifications:

Use in this experiment a polymer called ac Resin A 203 UV (BASF) with a significant lower $T_G$<−20° C. developed for applications as for example Hot Melt Adhesive. Soak the fibers in a slurry formed by 15 g of the water-insoluble polymer in 1028 ml of tetrahydrofuran as described in step 2.

Example IX

Polymeric resins comprising UV-reactive groups of the present invention are used in a process in accordance with the hereinbefore described procedure of Example III with the following modifications:

Provide for each sample in step 1 40 g of cellulosic fiber. A slurry is formed as in step 2 by adding the fibers to 1370 ml of water containing 15 g of said polymer, 193.6 g Fixapret CM and 27.2 g of Magnesiumchloride hexahydrate. The aqueuos solution is filtrated prior to addition of the fibers due to a spontaneuosly formed precipitate.

Prior to air-laying the fibers in step 6 the nearly dry fibers are cured in an air-through drying oven for a period of about 25 minutes at a temperature of about 90° C. and another 3 min. at a temperature of about 150° C.

Example X

Polymeric resins comprising UV-reactive groups of the present invention are used in a process in accordance with the hereinbefore described procedure of Example III with the following modifications:

Provide for each sample in step 1 40 g of cellulosic fiber. After step 7 a slurry is formed as in step 2 by adding 12 g of the treated fiber obtained after step 7 to 389 ml of water containing 55.0 g Fixapret CM and 7.7 g of Magnesium-chloride hexahydrate. Steps 1 to 5 are repeated with this slurry. Prior to air-laying the fibers again the nearly dry fibers are cured in an air-through drying oven for a period of about 25 minutes at a temperature of about 90° C. and another 3 min. at a temperature of about 150° C. The fibers are air-laid to form absorbent pads with a thickness of about 6 mm equal to a web of 200 g/m².

Example XI

Polymeric resins comprising UV-reactive groups of as preferred in formula I of the present invention can be used in a process in accordance with the hereinbefore described procedure of Example III-VII to obtain basically the same good results as described in table 1.

TABLE 1

| Example | Brightness | Uptake [g/g] | MDP [cm of water] | Brightness CIE |
|---------|------------|--------------|-------------------|----------------|
| I | 75 | 12.7 | 19.9 | 43.2 |
| II | 74 | 14.8 | 21.6 | 41.5 |
| III | 80 | 12.5 | 13.9 | 69.4 |
| IV | 79 | 12.3 | 15.0 | 64.8 |
| V | 80 | 12.2 | 14.5 | 68.9 |
| VI | 77 | 15.8 | 16.0 | 55.1 |
| VII | 79 | 12.2 | 15.1 | 63.7 |
| VIII | 79 | 0.8 | —* | 65.4 |
| IX | 78 | 17.7 | 12.0 | |
| X | 79 | 20.2 | 12.2 | |

*The MDP could not be determined due to the low uptake.

The invention claimed is:

1. A method of crosslinking a fibrous material comprising a step of irradiating a composition comprising the fibrous material and a radiation-activatable polymeric resin, said resin comprising a polymeric backbone and radiation-activatable groups which upon being impacted by radiation energy form crosslinking bonds, wherein said radiation activatable polymeric resin is built up from free radical polymerizable compounds and has a glass transition temperature of 5° C. or more.

2. The method of claim 1 wherein the radiation-activatable polymeric resin has a glass transition temperature of 50° C. or more.

3. The method of claim 1 wherein the radiation-activatable groups are covalently bound to the polymeric backbone.

4. The method of claim 1 wherein the radiation-activatable polymeric resin has a water solubility of at least 1 g/l.

5. The method of claim 4 wherein the radiation-activatable polymeric resin has a water solubility of at least 10 g/l.

6. The method of claim 1 wherein the composition further comprises a thermally reactive agent capable of forming crosslinking bonds between the radiation-activatable polymer resin and the fibrous material by a thermal curing step preceding the irradiation step, during the irradiation step, or after the irradiation step.

7. The method of claim 6 wherein said thermally reactive agent comprises a low molecular weight crosslinker.

8. A method of claim 7 wherein said low molecular weight crosslinker comprises a modified dimethylol dihydroxy ethylene urea.

9. The method of claim 1 wherein said radiation-activatable group is bound to an optional spacer which is bound to an anchor group, and said radiation-activatable group is selected from the group consisting of an acetciphenone, a benzophenone, an anthraquinone, a benzil, a thioxanthone, and a xanthone.

10. The method of claim 1 wherein said radiation-activatable group is represented by formula II

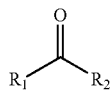

formula II wherein $R_1$ denotes an organic radical selected from the group of methyl and aryl, and $R_2$ is selected from the group of consisting of aryl, alkyl of 1 to 4 carbon atoms, cyclopropyl, cyclopentyl, cyclohexyl, α, α-dialkoxyalkyl, and α-hydroxyalkyl, and is covalently bound to a spacer group, and said spacer group is bound to an anchor group and selected from the group consisting of a covalent bond, an organic bifunctional radical having an $M_w$ of up to 1000, and a polymeric bifunctional radical chain having an $M_w$ of up to 20,000, wherein said anchor group is covalently bound to the polymeric backbone.

11. The method of claim 1 wherein said polymeric backbone is obtainable from one or a mixture of two or more monomer molecules selected from the group consisting of ethylene, propylene, vinyl chloride, vinyl amine, allyl amine, vinyl formamide, vinyl acetamide, aziridine, vinyl alcohol, vinyl acetate, isobutylene, styrene, isoprene, acrylonitrile, acrylic acid, methacrylic acid, ethyl acrylate, butyl acrylate, maleic acid, maleic acid anhydride, a maleic acid ester, fumaric acid, itaconic acid, methyl methacrylate, vinyl acrylate, allyl methacrylate, allyl sulfonate, vinyl sulfonate, acryl-amide, methacrylamide, acrylamidomethylpropane sulfonate, a $C_1$–$C_4$-hydroxyalkyl methacrylate, a $C_1$–$C4$-hydroxyalkyl acrylate, tripropylene glycol diacrylate, trimethylol propane ethoxylated triacrylate, an epoxy acrylate, a polyethylene glycol monoacrylate, a polyethylene glycol diacrylate, ethylene oxide, a polyethylene glycol monoallyl ether, a polyethylene glycol diallyl ether, ethoxylated trimethylolpropane triacrylate, propylene oxide, a polyester acrylate, and a urethane acrylate.

12. A crosslinked fibrous material prepared by the method of claim 1.

13. The crosslinked fibrous material of claim 12 wherein said crosslinked material has a brightness equal to or greater than 76.

14. The crosslinked fibrous material of claim 12 wherein said crosslinked material has a brightness equal to or greater than 80.

15. The method of claim 1 wherein said radiation energy is selected from the group of ultraviolet light, electronic beam, and infrared light.

16. The method of claim 15 wherein said radiation energy is ultraviolet light between 220 nm and 340 nm.

17. The method of claim 15 wherein said radiation-activatable polymeric resin is present in an amount of less than 50% by weight of the fibrous material.

18. The method of claim 17 wherein said radiation-activatable polymeric resin is present in an amount resulting in a polymer resin/fibrous material dry weight portion of more than 0.10% by weight of fibrous material.

19. The method of claim 1 wherein the fibrous material comprises fibers of cellulose, polyethylene, polypropylene, a polyester, polyacrylonitrile, a polyamide, or a protein.

20. A radiation-activatable polymeric resin comprising a polymeric backbone and radiation-activatable groups, said resin built up from free radical polymerizable compounds wherein at least 40% of the compounds are nonphotoreactive, wherein said radiationactivatable group is bound to an optional spacer which is bound to an anchor group, and said radiationactivatable group selected from the group consisting of an acetophenone, a benzophenone, an anthraquinone, a benzil, a thioxanthone, and a xanthone, and wherein the radiation-activatable polymeric resin has a water solubility of at least 1 g/l and has a glass transition temperature of 5° C. or more.

21. The radiation-activatable polymeric resin of claim 20 wherein the radiation-activatable polymeric resin has a glass transition temperature of 50° C. or more.

22. The radiation-activatable polymeric resin of claim 20 wherein said radiation-activatable group is a benzophenone derivative.

23. The method of claim 10 wherein $R_1$ is phenyl or substituted phenyl.

* * * * *

UNITED STATES PATENT AND TRADEMARK OFFICE
CERTIFICATE OF CORRECTION

PATENT NO. : 7,135,209 B2
APPLICATION NO. : 10/478279
DATED : November 14, 2006
INVENTOR(S) : Thomas Daniel et al.

It is certified that error appears in the above-identified patent and that said Letters Patent is hereby corrected as shown below:

On the Title Page:

Item (30), "101 27 838" should be -- 101 27 838 .1 --.

In the Claims:

At Column 14, line 63, "acetciphenone" should be -- acetophenone --.

At Column 16, line 24, "radiationactivatable" should be -- radiation-activatable --.

At Column 16, line 26, "radiationactivatable" should be -- radiation-activatable --.

Signed and Sealed this

Thirteenth Day of March, 2007

JON W. DUDAS
*Director of the United States Patent and Trademark Office*